(12) United States Patent
Rocas Sorolla

(10) Patent No.: US 8,815,001 B2
(45) Date of Patent: Aug. 26, 2014

(54) COMPOUND FOR MANUFACTURING WATERMARK IN A TEXTILE SHEET MATERIAL AND THE CORRESPONDING COMPOSITION, MATERIAL, METHOD AND USE

(76) Inventor: Joseph Rocas Sorolla, Castelldefels (ES)

( * ) Notice: Subject to any disclaimer, the term of this patent is extended or adjusted under 35 U.S.C. 154(b) by 0 days.

(21) Appl. No.: 13/522,518

(22) PCT Filed: Jan. 17, 2011

(86) PCT No.: PCT/ES2011/070025
§ 371 (c)(1),
(2), (4) Date: Jul. 17, 2012

(87) PCT Pub. No.: WO2011/086224
PCT Pub. Date: Jul. 21, 2011

(65) Prior Publication Data
US 2012/0295079 A1 Nov. 22, 2012

(30) Foreign Application Priority Data
Jan. 18, 2010 (ES) .................................. 201030052

(51) Int. Cl.
| C09D 5/00 | (2006.01) |
| C07F 7/18 | (2006.01) |
| B41M 3/10 | (2006.01) |
| B23B 3/10 | (2006.01) |
| C08G 18/28 | (2006.01) |
| C08G 18/80 | (2006.01) |
| D06Q 1/02 | (2006.01) |

(52) U.S. Cl.
CPC ............. C08G 18/289 (2013.01); B41M 3/10 (2013.01); C08G 18/8096 (2013.01); C08G 18/8064 (2013.01); C08G 18/2825 (2013.01); D06Q 1/02 (2013.01); C08G 18/282 (2013.01); C08G 18/809 (2013.01)
USPC ................. 106/31.43; 106/31.46; 106/31.47; 106/31.57; 106/31.58; 556/419; 556/436; 556/437; 556/441; 427/7; 428/195.1

(58) Field of Classification Search
USPC .......... 106/31.43, 31.46, 31.47, 31.57, 31.58, 106/31.75, 31.76, 31.77, 31.86, 31.88; 556/419, 436, 437, 441; 427/7; 428/195.1
See application file for complete search history.

(56) References Cited

U.S. PATENT DOCUMENTS

| 3,591,560 A * | 7/1971 | Wagner et al. .................. 528/81 |
| 3,676,478 A * | 7/1972 | Golitz et al. .................. 556/420 |
| 3,793,238 A * | 2/1974 | Winkelmann et al. ........ 264/216 |
| 3,903,052 A | 9/1975 | Wagner et al. |
| 4,048,207 A | 9/1977 | Jones |
| 4,508,889 A | 4/1985 | Noren et al. |
| 5,928,471 A * | 7/1999 | Howland et al. .............. 162/110 |
| 6,281,322 B1 | 8/2001 | Groth et al. |
| 7,875,693 B2 * | 1/2011 | Bernard et al. ................. 528/28 |
| 8,173,742 B2 * | 5/2012 | Bernard et al. ............... 524/588 |
| 8,378,037 B2 * | 2/2013 | Griswold ...................... 525/452 |
| 2010/0304017 A1 * | 12/2010 | Oliva Gurgui et al. ....... 427/145 |

FOREIGN PATENT DOCUMENTS

| DE | 19727029 | 1/1999 |
| GB | 2282611 | 12/1995 |
| JP | 62250021 | 10/1987 |
| JP | 2006111811 | 4/2006 |
| WO | WO 9010026 | 9/1990 |
| WO | WO 2008009388 | 1/2008 |
| WO | WO 2008135273 | 11/2008 |
| WO | WO2011/14086224 | 3/2012 |

OTHER PUBLICATIONS

H. Ni et al, Preparation and characterization of alkoxysilane functionalized isocyanurates, Feb. 1999.
Relevant Documents, Spanish Patent Office Jan. 18, 2010.

* cited by examiner

Primary Examiner — Helene Klemanski

(57) ABSTRACT

The invention relates to a compound for manufacturing watermark in a textile sheet material and the corresponding composition, material, method and use. The compound for manufacturing a watermark in a textile sheet material of formula

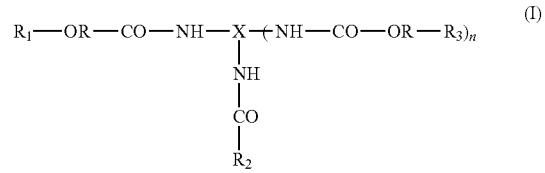

(I)

wherein

X is hexamethylene, trimethylhexamethylene, isophorone, dicyclohexylmethyl, tetramethylxylylene, tetramethylenexylene, xylylene, trimethylhexamethylene, hydrogenated 4,4'-diphenylmethylene, 1,12-dodecylene, 1,5-2-methylpentylene; 1,4-butylene; 1,4-cyclohexylene, or a compound of formula (II)

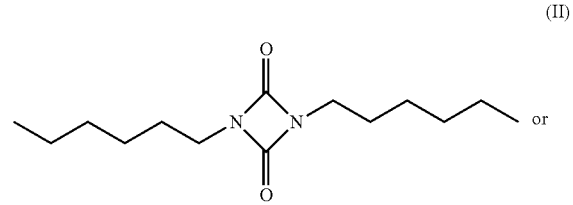

or

-continued

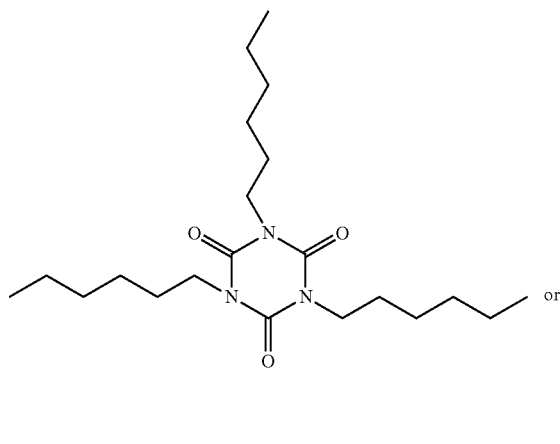
(III)

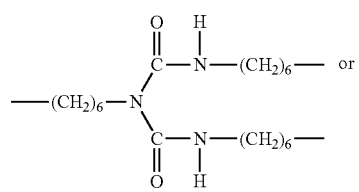
(IV)

-continued

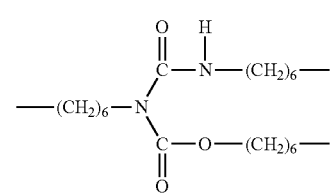
(V)

$R_1$ is a linear aliphatic C1-C12 alkyl radical or a branched aliphatic C3-C18 alkyl radical $R_2$ is a radical of formula

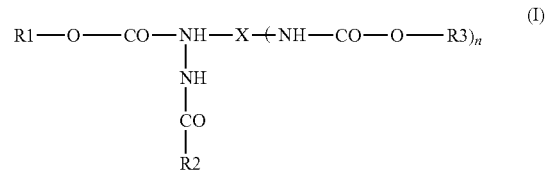
(I)

wherein
$R_4$ is methoxy or ethoxy
$R_5$ and $R_6$ are H, methoxy, ethoxy, methyl or ethyl
$R_7$ is cyclohexyl, phenyl or aliphatic C3-C6 alkyl
$R_3$ is a linear aliphatic C1-C12 alkyl radical or a branched aliphatic C3-C18 alkyl radical
n is 0 or 1.

22 Claims, No Drawings

COMPOUND FOR MANUFACTURING WATERMARK IN A TEXTILE SHEET MATERIAL AND THE CORRESPONDING COMPOSITION, MATERIAL, METHOD AND USE

FIELD OF THE INVENTION

The invention relates to a compound and a composition and uses thereof for manufacturing a watermark in a textile sheet material. The invention also relates to a textile sheet material having a watermark and a method for manufacturing a watermark in a textile sheet material.

STATE OF THE ART

Counterfeiting garments of famous trademarks is a known phenomenon. In some cases, the counterfeits also include a faithful reproduction of the trademark in question which occasionally makes it difficult for the public to distinguish between an original product and a counterfeit product, with subsequent damages both for the user and the owner of the trademark.

Despite the efforts made to prevent these counterfeits, it is very difficult to prevent them altogether. To that end, it is necessary to be able to include some type of marking or sign in the garments which allows a possible buyer to distinguish an original garment from a counterfeit garment.

SUMMARY OF THE INVENTION

The object of the invention is to overcome these drawbacks. This is achieved by means of a textile sheet material which is formed with a transparent textile material with a determined refractive index of RI value, characterized in that it comprises an area impregnated with a compound the refractive index of which is comprised between RI−0.6 and RI+0.6, preferably between RI−0.3 and RI+0.3, thus producing a watermark.

In fact, most sheet textile materials are manufactured from textile materials in the form of transparent threads. However, the textile sheet material as a whole is not transparent because its structure comprises a considerable amount of intertwined threads, hollow spaces (containing air), etc., which causes the light, upon traversing the textile sheet material, to encounter a plurality of phase changes, which causes its dispersion and, consequently, the textile sheet material as a whole is not transparent. However, if a textile sheet material is impregnated with a compound (such that the compound fills in all the hollow spaces and establishes a continuous connection between thread and thread) having a refractive index similar to that of the textile material (i.e., the thread), the rays of light are then able to traverse the whole of the material as if it was a single transparent medium, therefore a transparent appearance is achieved for the whole of the material in the impregnated area, where a watermark is generated.

In principle, this can be achieved for any textile material provided that it is transparent, and it can even be a mixture of textile materials provided that their refractive indices are equal or sufficiently similar. Likewise, in principle this concept can be applied to any textile material regardless of how it is manufactured and its threads are distributed.

A fragment of textile sheet material with a transparent area (i.e., with a watermark) which can be easily detected by a possible buyer can thus be included in a garment. For example, most garments include some labels which include information on its origin, the materials used, the conditions in which the garment must be washed, etc. This watermark can preferably be included in a label and may have a specific shape, for example, the shape of the manufacturer's mark.

The textile material is preferably a material from the group consisting of polyester, polyamide, polyurethane, acrylic fiber, regenerated cellulose fibers, cotton, linen, wool and silk, and it is particularly advantageous that the textile material is polyester. In fact, the labels of the garments are preferably made from polyester and as discussed above, the watermark is preferably placed in a label of the garment.

The watermark preferably has a function of indicating and assuring its origin. In this sense, it is not necessary for the watermark to be particularly resistant to garment washing because once the garment is purchased, the watermark has already carried out its function. However, the fact that the watermark is gradually eliminated with successive garment washings may be undesirable for various reasons, among others due to a possible "image loss" as well as giving the buyer a feeling of "bad quality". Therefore, it is advantageous that the watermark is made from a compound that is resistant to repeated garment washing. This washing must be understood as a conventional washing performed in household washing machines.

It is also advantageous for the watermark to not turn yellow or darken over time due to the presence of air and light. To that end, materials resistant to light and air must be used in the conditions in which the label or the garment having the watermark is applied and used. The darkening or yellowing of the watermark makes it more visible and also more easily detectable and imitable. In the event that the watermark has its own design color, this could be modified or be affected by the yellowish color or darkening of the watermark's background.

Consequently, the use of a compound for impregnating an area of a textile sheet material is also an object of the invention, wherein the textile sheet material is formed with a transparent textile material with a determined refractive index of RI value, and wherein the compound has a refractive index which is comprised between RI−0.6 and RI+0.6, preferably between RI−0.3 and RI+0.3, thus producing a watermark. As mentioned above, the textile material is preferably a material from the group consisting of polyester, polyamide, polyurethane, acrylic fiber, regenerated cellulose fibers, cotton, linen, wool and silk, particularly polyester.

A method for manufacturing a watermark in a textile sheet material which is formed with a transparent textile material with a determined refractive index of RI value is also an object of the invention, characterized in that it comprises a printing stage in which an area of said textile sheet material is impregnated with a compound the refractive index of which is comprised between RI−0.6 and RI+0.6, preferably between RI−0.3 and RI+0.3, thus producing a watermark. The textile material is preferably a material from the group consisting of polyester, polyamide, polyurethane, acrylic fiber, regenerated cellulose fibers, cotton, linen, wool and silk, particularly polyester.

The printing stage is preferably performed in hot conditions by applying the compound or the composition containing it at about 40-60° C. because the product is thus more fluidized, improving the penetration, particularly in the case of thick and/or pressed fabrics.

Another object of the invention is a compound of formula

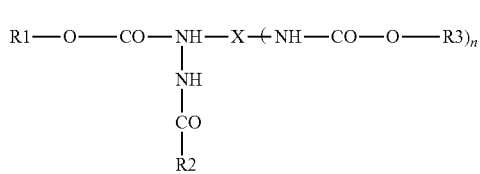 (I)

wherein
a) X is hexamethylene, trimethylhexamethylene, isophorone, dicyclohexylmethyl, tetramethylxylylene, tetramethylenexylene, xylylene, trimethylhexamethylene, hydrogenated 4,4'-diphenylmethylene, 1,12-dodecylene, 1.5-2-methylpentylene, 1,4-butylene, 1,4-cyclohexylene, or a compound of formula

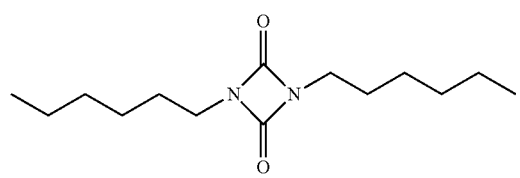 (II)

normally referred to as 1,3-diazetidine-2,4-dione 1,3-bis(6-hexyl) or 2,4-dioxo-1,3-diazetidine-1,3-bis(hexamethylene)
or a compound of formula

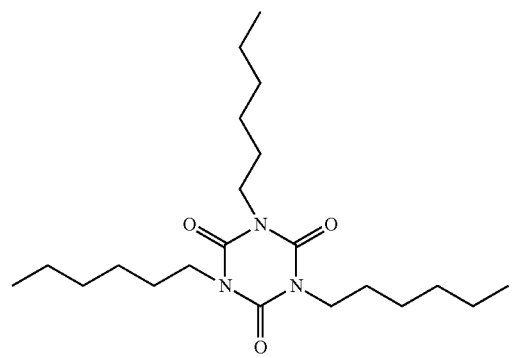 (III)

normally referred to as 1,3,5-triazine-2,4,6(1H,3H,5H)-trione 1,3,5-tris(6-hexyl) or (2,4,6-trioxotriazine-1,3,5(2H,4H,6H)-triyl)tris(hexamethylene)
or a compound of formula

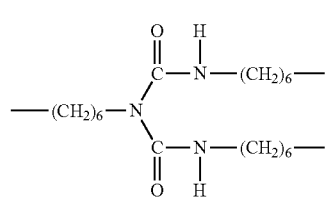 (IV)

normally referred to as imidocarbonic diamide N,N',2-tris(6-hexyl), or a compound of formula

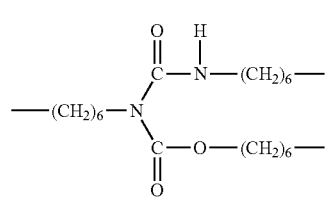 (V)

b) $R_1$ is a linear aliphatic C1-C12 alkyl radical or a branched aliphatic C3-C18 alkyl radical
c) $R_2$ is a radical of formula

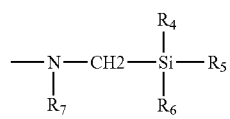 (VI)

wherein
c1) $R_4$ is methoxy or ethoxy,
c2) $R_5$ is H, methoxy, ethoxy, methyl or ethyl,
c3) $R_6$ is H, methoxy, ethoxy, methyl or ethyl,
c4) $R_7$ is cyclohexyl, phenyl or aliphatic C3-C6 alkyl,
d) $R_3$ is a linear aliphatic C1-C12 alkyl radical or a branched aliphatic C3-C18 alkyl radical, and
e) n is 0 or 1.

In fact, it has been observed that these compounds allow obtaining a great transparency effect in most the textile materials. It is possible to adjust their refractive index by modifying the radicals, such that for example, the inclusion of radicals with long alkyl chains allows obtaining lower refractive indices, while the inclusion of more functionalized and/or more hydrophilic radicals allows obtaining higher refractive indices.

These compounds also have the advantage of being liquids at room temperature or at temperatures close to room temperature so they can be used in printing, for example in flexography, which allows printing the watermark in the textile sheet material by means of printing techniques, particularly by means of flexography. Likewise, they can be dissolved in low toxicity solvents, which again is advantageous for its use in printing.

Another advantage of these compounds is that it is possible to adjust their viscosity by properly choosing the radicals. In fact, as discussed above, it is advantageous for the watermark to have a specific shape. To that end, it is advisable that the viscosity be high enough for it to avoid migrations (which would make forming shapes more or less complicated) but low enough for it to be able to be applied by means of printing techniques and for it to penetrate well into the textile sheet material, filling in the pores. Consequently, each textile sheet material will require adjusting the values of the radicals (and of the solvents) until reaching the optimal equilibrium.

Preferably, there is a cross-linking stage after the printing stage which anchors (or fixes) the compound in the textile sheet material. In this sense, these compounds have the additional advantage that they spontaneously cross-link with one other (after drying the small amount of solvent that they may have, and in the presence of ambient humidity), bonds being established between the molecules of the compound through the radical $R_2$, such that the watermark is resistant to washing the textile sheet material with water. In fact, the radical of formula IV, which is an alpha amino silane having a high capacity for reacting with another alpha amino silane through a hydroxyl radical, forming a silica oxide-type (silicate) (Si—O—Si) bond in the presence of water (the presence of ambient humidity being sufficient to give rise to this reaction). This reaction takes place in two steps: the hydrolysis of the silane group (—SiOCH3) with water takes place in the first step, becoming silanol (—SiOH), and in a second step two silanol groups react with one another forming —Si—O—Si— with the loss of a water molecule. The particularity that the silica atom has four substitutions, two or three of them of the reactive silane type, causes it to have a high cross-linking capacity and this finally leads to the high stability and insolubility of the cured end product in most adverse conditions (temperature, air oxidation, abrasion, etc.) and solvents in general, including water itself.

As can be seen, the basic structure of the compound of formula (I) is a compound with a urethane-type bond between $R_1$ and X and, if n=1, also between X and $R_3$, and a urea-type bond from the reaction between an isocyanate group and the amine of the radical of formula (VI) (the alpha amino silane). Therefore, a method for manufacture can be the reaction of a di- or triisocyanate having X as a central structure with $R_1$—OH and $R_3$—OH type alcohols and subsequently the reaction of the corresponding urethane with an alpha amino silane of formula (VI). It must therefore be understood that by means of the expression "X", the intention is to indicate the structure resulting from removing the isocyanate groups from the following compounds: hexamethylene 1,6-diisocyanate (HDI), trimethylhexamethylene diisocyanate, isophorone diisocyanate (IPDI), dicyclohexylmethyl diisocyanate, tetramethylxylene diisocyanate (TMXDI), tetramethylenexylene diisocyanate, xylylene diisocyanate, trimethylhexamethylene diisocyanate, hydrogenated diphenylmethane 4,4'-diisocyanate (HMDI), 1,12-diisocyanatedodecane, 1,5-diisocyanate-2-methylpentane, 1,4-diisocyanatebutane, 1,4-cyclohexylene diisocyanate, 1,3-diazetidine-2,4-dione 1,3-bis(6-isocyanatehexyl), 1,3,5-triazine-2,4,6(1H,3H,5H)-trione 1,3,5-tris(6-isocyanatehexyl), or imidocarbonic diamide N,N',2-tris(6-isocyanatehexyl) (which is the biuret resulting from HDI reacted with a water molecule, also referred to as N,N',2-tris(6-isocyanatehexyl)imidocarbonic diamide, 1,3,5-tris(6-hydroxyhexyl)triisocyanate biuret, or hexamethylene diisocyanate biuret), for the purpose of formally adjusting them to the formula (I). Some diisocyanates have the ability to combine with one another, forming dimers or trimers, such as for example in the case of HDI, forming dimers, the central structure of which corresponds to formula (II) (after removing the isocyanate groups to be able to be formally fitted into formula (I)), and trimers, the central structure of which corresponds to formula (III) (after again removing the isocyanate groups to be able to be formally fitted into formula (I), the compound of formula (III) is also referred to as hexamethylene triisocyanurate). Generally, any of the aforementioned diisocyanates or triisocyanates as well as any dimer or trimer derived therefrom can be used in the present invention. Some examples thereof may be HDI uretdione dimers, HDI trimethylolpropane trimer, HDI or IPDI isocyanurate trimers, HDI or IPDI biuret trimers, HDI allophanates, etc. In any event, it is advantageous for the isocyanates to not be directly bound to aromatic rings as they will turn yellow over time and in the presence of light by oxidation. In this sense, the HDI dimer (the central structure of which is formula (II)), the HDI trimer (the central structure of which is formula (III)) as well as their mixtures, are particularly advantageous because these isocyanates are relatively small and are non-cyclic, and the compounds derived from them are more fluid.

It would also be possible to conceive a compound which, starting from a triisocyanate, has a single urethane-type bond and, in exchange, has two bound alpha amino silanes (i.e., substituting —O—$R_3$ with another —$R_2$). However, these compounds are denser and therefore they are less recommendable.

When choosing the radicals $R_1$ and, where appropriate, $R_3$, it is advisable to choose them such that the resulting compound is liquid and not solid, although they could also be melted and applied in the molten textile sheet material, but they will have a greater tendency to crystallize and this will make them loss transparency.

A preferred family of compounds is obtained when n is 0 and $R_4$, $R_5$ and $R_6$ are each methoxy or ethoxy. It is especially advantageous that each of them is ethoxy. In fact, there are some compounds with low cross-linking capacity when n=0, therefore it is of interest for the alpha amino silane to have more hydroxyls suitable for cross-linking. $R_1$ is preferably octyl or 2-ethylhexyl.

Another preferred family of compounds is when n is 1 and $R_4$ and $R_5$ are ethoxy and $R_6$ is methyl. In this case, it is particularly advantageous that $R_1$ and $R_3$ are octyl or 2-ethylhexyl.

$R_2$, i.e., the alpha amino silane of formula IV, is preferably N-cyclohexylaminomethylmethyldiethoxysilane or N-cyclohexylaminomethyltriethoxysilane.

Advantageously, the textile sheet material according to the invention is impregnated with a compound such as those described above or with a compound directly derived from the cross-linking thereof.

As discussed above, the use of a compound according to the invention for impregnating a textile sheet material to produce a watermark is also advantageous, and it also advantageous to use a compound according to the invention in the method for manufacturing a watermark as indicated above.

Finally, a composition for manufacturing a watermark in a textile sheet material is also an object of the invention, characterized in that it comprises a compound of formula (I) according to the invention and a solvent, preferably from the group consisting of toluene, xylene, turpentine, propylene carbonate, ethylene carbonate and mixtures thereof, where the solvent is in a proportion comprised between 5% and 25% by weight with respect to the total weight of the composition. In fact, this composition is particularly suitable for use thereof for manufacturing watermarks with a viscosity value that allows good fabric penetration but which prevents composition migration in the fabric, and it uses solvents suitable for being handled in printing. Each product requires adjusting the viscosity and the concentration for the application thereof in a determined fabric. It is necessary so that it can be handled to achieve good penetration, good anchorage in the fabric and ultimately a good transparency for achieving a good watermark. When working with the preferred ideal products (see above) the concentration of the product is relatively high (>85%) and the working viscosity is between 6000 and 8000 cps at 25° C. However, it may be necessary to properly thicken or dilute the product to achieve its final properties on the fabric depending on the type of fabric, the thread of the fabric, its compacting and porosity, its capacity of being moistened by the solvent used.

The solvent is preferably toluene or propylene carbonate and is in a proportion comprised between 8% and 15% by weight with respect to the total weight of said composition.

The composition advantageously comprises a first compound of formula (I) with n=1 and a second compound of formula (I) with n=0. In fact, in this way there is greater versatility for combining the various parameters that come into play: refractive index, viscosity, penetrability, migration, cross-linking (anchoring in the fabric, i.e., resistance to washing), etc.

The composition preferably comprises a dye. In fact, watermarks additionally having a determined color or colors can thus be achieved. In this case, the amount of dye to be added must be low enough so that the transparency is not lost. In this sense, it is advantageous for the composition to have the dye in a proportion less than or equal to 2.5% by weight, preferably less than or equal to 1.5% by weight with respect to the total weight of the compound of formula (I). The dye must be a hydrophobic dye so that it can be dissolved in the hydrophobic compound.

The compound itself and/or the composition advantageously have a viscosity comprised between 5,000 and 10,000 cps, and more advantageously comprised between 6,000 and 8,000 cps.

EXAMPLES

Example 1

200.01 g (0.346 moles) of Desmodur® N 3400 and 90.11 g (0.692 moles) of octyl alcohol with an NCO:OH ratio of 3:2 are loaded and are left to react for approximately four hours in an inert nitrogen atmosphere at a temperature of 70° C. Desmodur® N 3400 is a mixture of hexamethylene diisocyanate trimer and hexamethylene diisocyanate dimer marketed by Bayer MaterialScience AG. The titrated NCO was 5.311% ($NCO_{thecretical}$: 5.010%). 10% dried toluene (32.27g) is then added for fluidizing the pre-polymer. The temperature is finally lowered to 25° C. and all the free NCO is covered with 81.19 g of AMEO (0.367 moles) (21.87% silane out of the total solids); the silane is added together with another 10% dried toluene, yielding an end product with a content of 80% solids. An aminopropyltriethoxysilane which is marketed by EVONIK INDUSTRIES AG under the name Dynasylan AMEO, and also by Wacker Chemie AG under the name Geniosil GF 93 has been called "AMEO". Generally, Desmodur N 3400 can be replaced with Polurene MT 100 which is the hexamethylene diisocyanate trimer marketed by SAPICI although it is more viscous.

Example 2

197.28 g (0.341 moles) of Desmodur N 3400 and 89.10 g (0.684 moles) of octyl alcohol with an NCO:OH ratio of 3:2 are loaded and are left to react for approximately three hours in an inert nitrogen atmosphere. The reaction temperature is 85° C. The titrated NCO was 4.973% ($NCO_{theoretical}$: 4.982%). The temperature is then lowered to 25° C. and 10% dried toluene (31.43 g) is added for fluidizing the pre-polymer. All the free NCO is then covered with 83.23 g (0.339 moles) of Geniosil 924 (22.52% silane out of the total solids); the silane is added together with another 10% dried toluene, yielding an end product with a content of 80% solids. Geniosil® XL 924 is an N-cyclohexylaminomethylmethyldiethoxysilane (CAS No. 27445-54-1) marketed by Wacker Chemie AG.

Example 3

125.53 g (0.217 moles) of Desmodur N 3400 and 56.59 g (0.434 moles) of octyl alcohol with an NCO:OH ratio of 3:2 are loaded and left to react for approximately three hours in an inert nitrogen atmosphere. The reaction temperature is 85° C. The titrated NCO was of 4.922% ($NCO_{thecretical}$: 5.003%). The temperature is then lowered to 70° C. and 10% dried toluene (20.24 g) is added for fluidizing the pre-polymer. All the free NCO is finally covered with 26.20 g (0.107 moles) of Geniosil 924 (12.57% silane out of the total solids) and with 23.66 g (0.107 moles) of AMEO (11.48% silane out of the total solids); the silanes are also added with dried toluene, yielding an end product with a content of approximately 85% solids.

Example 4

150.30 g (0.260 moles) of Desmodur N 3400 and 84.54 g (0.649 moles) of octyl alcohol with an NCO:OH ratio of 1.20:1 are loaded and left to react for approximately two and a half hours in an inert nitrogen atmosphere. The reaction temperature is 85° C. The titrated NCO was 1.757% ($NCO_{theoretical}$: 2.34%). The temperature is then lowered to 25° C. and 10% dried toluene (26.09 g) is added for fluidizing the pre-polymer. All the free NCO is finally covered with 24.16 g (0.098 moles) of Geniosil 924 (9.33% silane out of the total solids). The yielded end product has a content of 90% solids.

Example 5

103.18 g (0.178 moles) of Desmodur N 3400 and 58.47 g (0.449 moles) of octyl alcohol with an NCO:OH ratio of 1.20:1 are loaded and left to react for approximately six hours in an inert nitrogen atmosphere. The reaction temperature is 85° C. The titrated NCO was 2.271% ($NCO_{thecretical}$: 2.240%). The temperature is then lowered to 25° C. and 10% dried toluene (18 g) is added for fluidizing the pre-polymer. All the free NCO is finally covered with 24.02 g (0.087 moles) of Geniosil 926 (13% silane out of the total solids). The yielded end product has a content of 90% solids. Geniosil XL 926 is an N-cyclohexylaminomethyl triethoxysilane (CAS No 26495-91-0) marketed by Wacker Chemie AG.

Example 6

108.25 g (0.187 moles) of Desmodur N 3400 and 49.22 g (0.378 moles) of octyl alcohol with an NCO:OH ratio of 1.50:1 are loaded and left to react for approximately three hours in an inert nitrogen atmosphere. The reaction temperature is 85° C. The titrated NCO was 4.795% ($NCO_{theoretical}$: 4.904%). The temperature is then lowered to 25° C. and 10% dried toluene (17.59 g) is added for fluidizing the pre-polymer. All the free NCO is finally covered with 49.62 g (0.180 moles) of Geniosil 926 (24% silane out of the total solids). The yielded end product has a content of 90% solids.

Example 7

102.23 g (0.177 moles) of Desmodur N 3400 and 65.81 g (0.354 moles) of Isofol 12, 2-butyl-1-octanol with an NCO:OH ratio of 1.50:1 are loaded and left to react for approximately three and a half hours in an inert nitrogen atmosphere. The reaction temperature is 85° C. The titrated NCO was 4.402% ($NCO_{theoretical}$: 4.417%). The temperature is then lowered to 25° C. and 10% dried toluene (18.71 g) is added for fluidizing the pre-polymer. All the free NCO is finally covered with 48.51 g (0.176 moles) of Geniosil 926 (22.4% silane out of the total solids). The yielded end product has a content of 90% solids.

Example 8

137.50 g (0.238 moles) of Desmodur N 3400 and 62.34 g (0.479 moles) of octyl alcohol with an NCO:OH ratio of 1.50:1 are loaded and left to react for approximately four and a half hours in an inert nitrogen atmosphere. The reaction temperature is 85° C. The titrated NCO was 4.832% ($NCO_{theoretical}$: 4.940%). The temperature is then lowered to 25° C. and 20% dried toluene (49.175 g) is added for fluidizing the pre-polymer. All the free NCO is finally covered with 63.30 g (0.230 moles) of Geniosil 926 (24.10% silane out of the total solids). The yielded end product has a content of 80% solids.

Example 9

The product of example 8 is repeated but adding 10% propylene carbonate (21.86 g) as solvent.

Examples 10a and 10b 133.50 g (0.231 moles) of Desmodur N 3400 and 60.21 g (0.462 moles) of octyl alcohol with an NCO:OH ratio of 1.50:1 are loaded and left to react for approximately two and a half hours in an inert nitrogen atmosphere. The reaction temperature is 85° C. The titrated NCO was 4.815% ($NCO_{theoretical}$: 4.998%). The temperature is then lowered to 25° C. and 10% dried toluene (22.10g) is added for fluidizing the pre-polymer. All the free NCO is finally covered with 54.58 g (0.222 moles) of Geniosil 924 (21.98% silane out of the total solids). The yielded end product in example 10a has a content of 90% solids and a viscosity of 6100 cps at 25° C. This is a particularly advantageous form of carrying out the invention. Another particularly advantageous form of carrying out the invention is obtained by substituting the toluene with propylene carbonate which corresponds to example 10b, in which case the end product has a viscosity of 7100 cps at 25° C. The use of propylene carbonate instead of toluene presents several advantages because it is not inflammable, it does not smell, it is considered less problematic (harmful) than toluene, etc. However, it is less volatile therefore large amounts cannot be used, and it must be ensured that it evaporates during the application process and does not entail a migration of the mark before fixing by cross-linking thereof in the fabric.

Examples 11a and 11b

The products of examples 10a and 10b are repeated and 1.07% yellow dye is added to them.

Examples 12a and 12b

The products of examples 10a and 10b are repeated and 0.89% red dye is added to them.

Examples 13a and 13b

The products of examples 10a and 10b are repeated and 0.83% blue dye is added to them.

Example 14

The product of example 6 is repeated and 0.83% yellow dye is added to it.

Example 15

The product of example 6 is repeated and 0.85% red dye is added to it.

Example 16

The product of example 6 is repeated and 0.81% blue dye is added to it.

Example 17

The product of example 9 is repeated and 1.04% yellow dye is added to it.

Example 18

The product of example 9 is repeated and 1.06% red dye is added to it.

Example 19

The product of example 9 is repeated and 1.07% blue dye is added to it.

It should be noted that the concentration of dye added to each product may vary depending on the color intensity to be obtained in the polyester tape.

A table summarizing all the examples mentioned above is shown below (Table 1):

TABLE 1

| | Pre-polymer | NCO:OH | Solvent | Silane | % silane | Dye | % dye |
|---|---|---|---|---|---|---|---|
| Ex. 1 | Desmodur Octanol | 3:2 | 20% toluene | AMEO | 21.87% | — | — |
| Ex. 2 | Desmodur Octanol | 3:2 | 20% toluene | Geniosil 924 | 22.52% | — | — |
| Ex. 3 | Desmodur Octanol | 3:2 | 15% toluene | AMEO Geniosil 924 | 11.48% 12.57% | — | — |
| Ex. 4 | Desmodur Octanol | 1.20:1 | 10% toluene | Geniosil 924 | 9.33% | — | — |
| Ex. 5 | Desmodur Octanol | 1.20:1 | 10% toluene | Geniosil 926 | 13.00% | — | — |
| Ex. 6 | Desmodur Octanol | 1.50:1 | 10% toluene | Geniosil 926 | 24.00% | — | — |
| Ex. 7 | Desmodur Isofol 12 | 1.50:1 | 10% toluene | Geniosil 926 | 22.40% | — | — |

TABLE 1-continued

Summary of examples

| | Pre-polymer | NCO:OH | Solvent | Silane | % silane | Dye | % dye |
|---|---|---|---|---|---|---|---|
| Ex. 8 | Desmodur Octanol | 1.50:1 | 20% toluene | Geniosil 926 | 24.10% | — | — |
| Ex. 9 | Desmodur Octanol | 1.50:1 | 10% propylene carbonate | Geniosil 926 | 24.10% | — | — |
| Ex. 10a and 10b | Desmodur Octanol | 1.50:1 | 10% toluene or 10% propylene carbonate | Geniosil 924 | 21.98% | — | — |
| Ex. 11a or 11b | Desmodur Octanol | 1.50:1 | 10% toluene or 10% propylene carbonate | Geniosil 924 | 21.98% | Yellow | 1.07% |
| Ex. 12a or 12b | | | | | | Red | 0.89% |
| Ex. 13a or 13b | | | | | | Blue | 0.83% |
| Ex. 14 | Desmodur Octanol | 1.50:1 | 10% toluene | Geniosil 926 | 23.79% | Yellow | 0.83% |
| Ex. 15 | | | | | | Red | 0.85% |
| Ex. 16 | | | | | | Blue | 0.81% |
| Ex. 17 | Desmodur Octanol | 1.50:1 | 10% propylene carbonate | Geniosil 926 | 24.33% | Yellow | 1.04% |
| Ex. 18 | | | | | | Red | 1.06% |
| Ex. 19 | | | | | | Blue | 1.07% |

Application Data:

All the synthesized products are applied in the laboratory with a buffer on pieces of polyester tape. Each product is applied three times on each tape such that there are high product thickness, intermediate product thickness and low product thickness.

Once the products have been applied on the polyester tapes and left to dry, they are hand-washed three consecutive times with a powdered soap for home use (Norit® marketed by Grupo ACE Marca SL) and cold water. All the tapes are also washed three times in the washing machine at 40° C. to ensure the resistance of the products to washing. The results of the applications are shown in Table 2:

TABLE 2

Laboratory application results.

| | Product penetration into the tape | Resistance to washing by hand | Resistance to machine washing |
|---|---|---|---|
| Ex. 1 | Good The product spreads a little | Not very resistant to washing | Not very resistant to washing |
| Ex. 2 | Very good The product does not spread | Completely resistant to washing | Completely resistant to washing |
| Ex. 3 | Very good The product does not spread | Quite resistant to washing | Quite resistant to washing |
| Ex. 4 | Good The product spreads a lot | Not very resistant, the product spreads more | Not very resistant to washing Quality loss |
| Ex. 5 | Good The product spreads a lot | Not very resistant, the product spreads more | Not very resistant to washing Quality loss |
| Ex. 6 | Very good The product does not spread | Completely resistant to washing | Completely resistant to washing |
| Ex. 7 | Very good The product does not spread | Not very resistant to washing Quality loss | Not very resistant to washing |
| Ex. 8 | Very good The product does not spread | Completely resistant to washing | Completely resistant To washing |
| Ex. 9 | Very good The product does not spread | Completely resistant to washing | Completely resistant to washing |
| Ex. 10a and 10b | Very good The product does not spread | Completely resistant to washing | Completely resistant to washing |
| Ex. 11a and 11b Ex. 12a and 12b Ex. 13a and 13b | Very good The product does not spread | Completely resistant to washing | Completely resistant to washing |
| Ex. 14 Ex. 15 Ex. 16 | Very good The product does not spread | Completely resistant to washing | Completely resistant to washing |
| Ex. 17 Ex. 18 Ex. 19 | Very good The product does not spread | Completely resistant to washing | Completely resistant to washing |

The products in Table 2 showing the best result in terms of application and resistance to washing in a washing machine are reapplied on polyester tape and in label a printing machine. Various tests are conducted applying more or less amount of product.

The results obtained are good; all the products penetrate the polyester tape very well and the products containing dye have very good color intensity.

To ascertain if the products are resistant to washing, they are washed several times in the washing machine in hot conditions at 40° C. All the products, including those containing dye, are completely resistant to washing.

Comparative Example 20

221.90 g (0.387 moles) of Polurene MT100 and 101.02 g (0.774 moles) of octyl alcohol with an NCO:OH ratio of 1.50:1 are loaded and left to react for approximately two and a half hours in an inert nitrogen atmosphere. The reaction temperature is 85° C. The titrated NCO was 4.999% ($NCO_{theoretical}$: 5.023%). The temperature is then lowered to 25° C. and 10% polypropylene carbonate (36.00 g) is added for fluidizing the pre-polymer. The remaining NCO is finally reacted with 94.76 g (0.384 moles) of Geniosil 924 (22.69% silane out of the total solids). The yielded end product has a content of 90% solids. A very viscous product the viscosity of which cannot be easily measured at 25° C. is obtained. Its application is difficult at this concentration.

Comparative Example 21

188.82 g (0.329 moles) of Polurene MT100, 164.48 g of IPDI (0.739 moles) and 215.41 g (1.645 moles) of octyl alcohol with an NCO:OH ratio of 1.50:1 are loaded. The reaction starts at 50° C., when the temperature stabilizes, it is increased to 70° C. and when heat is no longer given off the temperature is increased to 85° C. The titrated NCO was 5.985% ($NCO_{theoretical}$: 6.017%). The temperature is then lowered to 25° C. and 10% polypropylene carbonate (62.25 g) is added for fluidizing the pre-polymer. The remaining NCO is finally reacted with 195.84 g (0.823 moles) of Geniosil 924 (25.61% silane out of the total solids). The yielded end product has a content of 90% solids. The viscosity of this product is 70620 cps at 25° C. Its application is difficult at this concentration.

These last two examples have very high viscosities which complicates their applications as such. To that end, it is advisable to dilute them with more solvent even though this leads to the watermark being less visible.

The invention claimed is:

1. A compound for manufacturing a watermark in a textile sheet material of formula

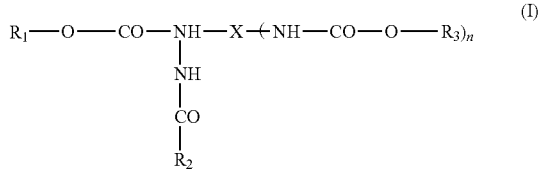

(I)

wherein
X is hexamethylene, trimethylhexamethylene, isophorone, dicyclohexylmethyl, tetramethylxylylene, tetramethylenexylene, xylylene, hydrogenated 4,4'-diphenylmethylene, 1,12-dodecylene, 1,4-butylene; 1,4-cyclohexylene, or a compound of formula

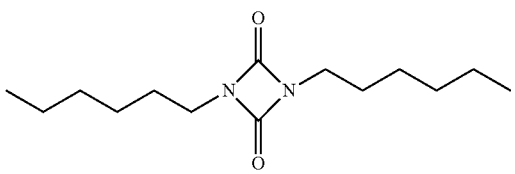

(II)

or a compound of formula

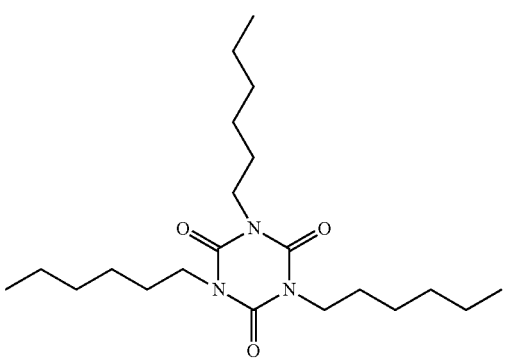

(III)

or a compound of formula

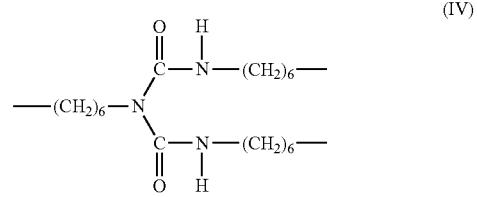

(IV)

or a compound of formula

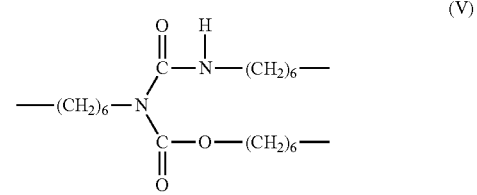

(V)

wherein $R_1$ is a linear aliphatic C1-C12 alkyl radical or a branched aliphatic C3-C18 alkyl radical;
$R_2$ is a radical of formula

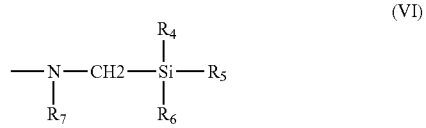

(VI)

wherein
$R_4$ is methoxy or ethoxy;
$R_5$ is H, methoxy, ethoxy, methyl or ethyl;
$R_6$ is H, methoxy, ethoxy, methyl or ethyl;
$R_7$ is cyclohexyl, phenyl or aliphatic C3-C6 alkyl;
$R_3$ is a linear aliphatic C1-C12 alkyl radical or a branched aliphatic C3-C18 alkyl radical; and
n is 0 or 1.

2. The compound according to claim 1, wherein n is 0 and $R_4$, $R_5$ and $R_6$ are each methoxy or ethoxy.

3. The compound according to claim 2, wherein $R_1$ is octyl or 2-ethylhexyl.

4. The compound according to claim 1, wherein n is 1, $R_4$ and $R_5$ are ethoxy and $R_6$ is methyl.

5. The compound according to claim 4, wherein $R_1$ and $R_3$ are octyl or 2-ethylhexyl.

6. The compound according to claim 1, wherein $R_2$ is

N-cyclohexylaminomethylmethyldiethoxysilane or

N-cyclohexylaminomethylmethyldiethoxysilane.

7. The compound according to claim 1, wherein said compound has a viscosity comprised between 5,000 and 10,000 cps at 25° C.

8. A composition for manufacturing a watermark in a textile sheet material, comprising a compound of formula $$R_1-O-CO-NH-X\underset{\underset{R_2}{\overset{\overset{NH}{|}}{\underset{CO}{|}}}}{(-NH-CO-O-R_3)_n} \quad (I)$$

wherein

X is hexamethylene, trimethylhexamethylene, isophorone, dicyclohexylmethyl, tetramethylxylylene, tetramethylenexylene, xylylene, hydrogenated 4,4'-diphenylmethylene, 1,12-dodecylene, 1,4-butylene; 1,4-cyclohexylene, or a compound of formula (II)

or a compound of formula (III)

or a compound of formula (IV)

or a compound of formula (V)

wherein $R_1$ is a linear aliphatic C1-C12 alkyl radical or a branched aliphatic C3-C18 alkyl radical;

$R_2$ is a radical of formula (VI)

wherein $R_4$ is methoxy or ethoxy;
$R_5$ is H, methoxy, ethoxy, methyl or ethyl;
$R_6$ is H, methoxy, ethoxy, methyl or ethyl;
$R_7$ is cyclohexyl, phenyl or aliphatic C3-C6 alkyl;
$R_3$ is a linear aliphatic C1-C12 alkyl radical or a branched aliphatic C3-C18 alkyl radical; and
n is 0 or 1;

and a solvent, selected from the group consisting of toluene, xylene, turpentine, propylene carbonate, ethylene carbonate and mixtures thereof.

9. A composition for manufacturing a watermark in a textile sheet material, according to claim 8, wherein said solvent is in a proportion comprised between 5% and 25% by weight with respect to the total weight of said composition.

10. The composition according to claim 8, wherein said solvent is toluene or propylene carbonate and is in a proportion comprised between 8% and 15% by weight with respect to the total weight of said composition.

11. The composition according to claim 8, wherein said compound comprises a first compound with formula (I) of n=1 and a second compound of formula (I) with n=0.

12. The composition according to claim 8, further comprising a dye.

13. The composition according to claim 12, wherein said dye is in a proportion less than or equal to 2.5% by weight with respect to the total weight of the compound of formula (I).

14. The composition according to claim 13, wherein said dye comprises less than or equal to 1.5% by weight with respect to the total weight of the compound of formula (I).

15. The composition according to claim 8, wherein said compound has a viscosity comprised between 5,000 and 10,000 cps at 25° C.

16. A textile sheet material which is formed with a transparent textile material with a determined refractive index of RI value, wherein said textile sheet material comprises an area impregnated with a compound
of formula

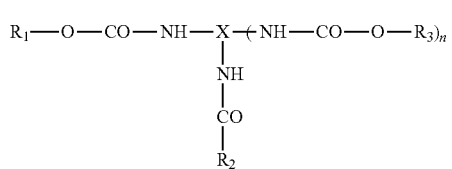

wherein

X is hexamethylene, trimethylhexamethylene, isophorone, dicyclohexylmethyl, tetramethylxylylene, tetramethylenexylene, xylylene, hydrogenated 4,4'-diphenylmethylene, 1,12-dodecylene, 1,4-butylene; 1,4-cyclohexylene, or a compound of formula

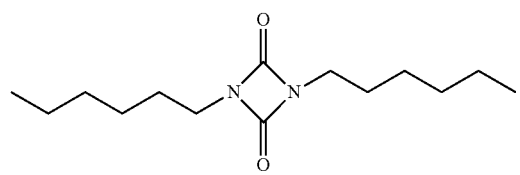

or a compound of formula

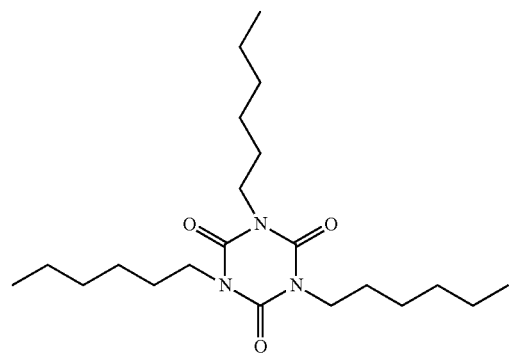

or a compound of formula

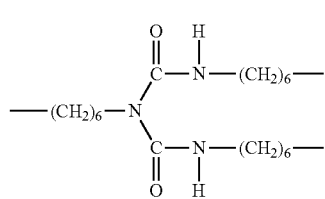

or a compound of formula

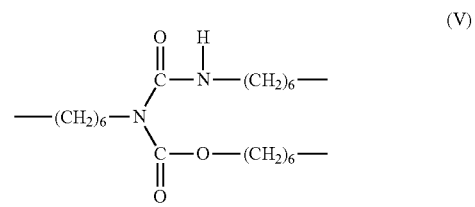

wherein $R_1$ is a linear aliphatic C1-C12 alkyl radical or a branched aliphatic C3-C18 alkyl radical;

R2 is a radical of formula

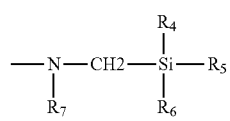

wherein $R_4$ is methoxy or ethoxy;

$R_5$ is H, methoxy, ethoxy, methyl or ethyl;

$R_6$ is H, methoxy, ethoxy, methyl or ethyl;

$R_7$ is cyclohexyl, phenyl or aliphatic C3-C6 alkyl;

$R_3$ is a linear aliphatic C1-C12 alkyl radical or a branched aliphatic C3-C18 alkyl radical, and n is 0 or 1, and the refractive index of which is comprised between RI-0.6 and RI+0.6, thus producing a watermark.

17. The textile sheet material according to claim 16, wherein said compound is a compound derived directly from the cross-linking thereof.

18. The textile sheet material according to claim 16, wherein said textile material is a material selected from the group consisting of polyester, polyamide, polyurethane, acrylic fiber, regenerated cellulose fibers, cotton, linen, wool and silk.

19. A method for manufacturing a watermark in a textile sheet material which is formed with a transparent textile material, with a determined refractive index of RI value, comprising a printing stage in which an area of said textile sheet material is impregnated with the compound
of formula

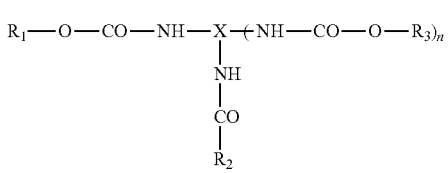

wherein

X is hexamethylene, trimethylhexamethylene, isophorone, dicyclohexylmethyl, tetramethylxylylene, tetramethylenexylene, xylylene, hydrogenated 4,4'-diphenylmethylene, 1,12-dodecylene, 1,4-butylene, 1,4-cyclohexylene, or a compound of formula

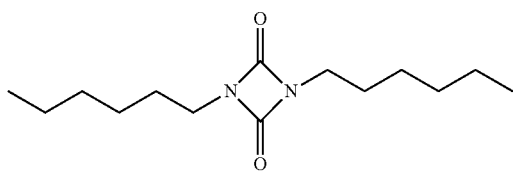

or a compound of formula

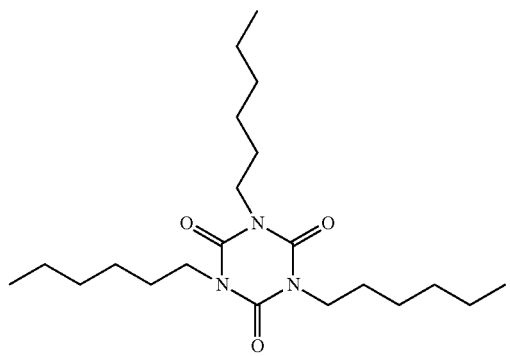

or a compound of formula

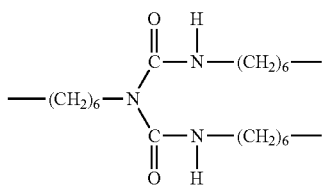

or a compound of formula

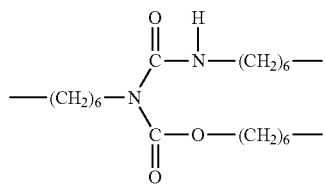

wherein $R_1$ is a linear aliphatic C1-C12 alkyl radical or a branched aliphatic C3-C18 alkyl radical;

$R_2$ is a radical of formula

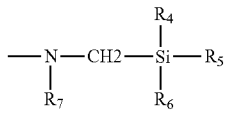

wherein
$R_4$ is methoxy or ethoxy;
$R_5$ is H, methoxy, ethoxy, methyl or ethyl;
$R_6$ is H, methoxy, ethoxy, methyl or ethyl;
$R_7$ is cyclohexyl, phenyl or aliphatic C3-C6 alkyl;
$R_3$ is a linear aliphatic C1-C12 alkyl radical or a branched aliphatic C3-C18 alkyl radical, and n is 0 or 1, and the refractive index of which is comprised between RI-0 6 and RI+0 6, thus producing a watermark.

20. The method according to claim 19, further comprising, after said printing stage, a cross-linking stage in which bonds are formed between the molecules of said compound through the radical $R_2$, such that said watermark is resistant to washing said textile sheet material with water.

21. The method according to claim 19, wherein said textile material is a material selected from the group consisting of polyester, polyamide, polyurethane, acrylic fiber, regenerated cellulose fibers, cotton, linen, wool and silk.

22. The method according to claim 19, wherein said compound has a viscosity comprised between 5,000 and 10,000 cps at 25° C.

* * * * *